United States Patent [19]

Yamada et al.

[11] Patent Number: 4,491,553

[45] Date of Patent: Jan. 1, 1985

[54] METHOD FOR PRODUCING FILLER-LOADED THERMOPLASTIC RESIN COMPOSITE

[75] Inventors: Hisashi Yamada; Masayuki Makise, both of Chiba; Tsutomu Katagiri, Tokyo; Kaname Abe, Yokohama, all of Japan

[73] Assignee: Lion Corporation, Tokyo, Japan

[21] Appl. No.: 392,062

[22] Filed: Jun. 25, 1982

Related U.S. Application Data

[63] Continuation-in-part of Ser. No. 164,094, Jun. 30, 1980, abandoned.

[30] Foreign Application Priority Data

Jul. 17, 1979 [JP] Japan .................................. 54-90657
Mar. 5, 1980 [JP] Japan .................................. 55-27611

[51] Int. Cl.³ .......................... B29B 1/04; B29D 27/00
[52] U.S. Cl. ..................................... 264/51; 264/117; 264/118; 264/122; 264/127; 264/349; 264/517
[58] Field of Search .................. 525/199; 264/51, 120, 264/127, 122, 517, 117, 118, 349; 521/134; 526/144, 300, 211

[56] References Cited

U.S. PATENT DOCUMENTS

| | | | |
|---|---|---|---|
| 2,991,508 | 7/1961 | Fields et al. | 264/127 |
| 3,054,761 | 9/1962 | Moore et al. | 264/127 |
| 3,528,879 | 9/1970 | Kometani et al. | 162/157 |
| 3,533,930 | 10/1970 | Lawton et al. | 264/127 |
| 3,838,092 | 9/1974 | Vogt et al. | 264/127 |
| 3,908,038 | 9/1975 | Niegard et al. | 427/336 |
| 4,042,747 | 8/1977 | Breton et al. | 264/127 |
| 4,153,661 | 5/1979 | Ree et al. | 264/127 |
| 4,183,887 | 1/1980 | Karg | 264/147 |
| 4,194,040 | 3/1980 | Breton et al. | 264/127 |
| 4,218,362 | 8/1980 | Houjo et al. | 264/127 |

*Primary Examiner*—James Lowe
*Attorney, Agent, or Firm*—Brisebois & Kruger

[57] ABSTRACT

The invention provides an improved method for producing a filler-loaded thermoplastic resin composite by mixing a thermoplastic resin with a filler, making it possible to be applied to molding machine such as extrusion and injection molding machines without the disadvantage of segregation between the resin and the filler otherwise inevitable leading to inferior uniformity of the shaped articles. The invention is characterized by the presence of a fibrillatable polytetrafluoroethylene during the mixing under mechanical shearing forces, wherein the thermoplastic resin is melted in one case and not melted in other case. The invention is also effective for shaping cellular foamed bodies of a filler-loaded thermoplastic resin with fine and uniform cellular structure.

14 Claims, No Drawings

METHOD FOR PRODUCING FILLER-LOADED THERMOPLASTIC RESIN COMPOSITE

CROSS-REFERENCE TO RELATED APPLICATION

This application is a continuation-in-part of U.S. application Ser. No. 164,094, filed June 30, 1980 now abandoned.

BACKGROUND OF THE INVENTION

The present invention relates to a method for producing a filler-loaded thermoplastic resin composite free from the problem of segregation of a resin component and a filler component during the mixing operation.

As is needless to say, thermoplastic resins are molded into shaped articles by the principle of plastic deformation of the plasticized or molten resin with an external shearing force. The process of molding of a thermoplastic resin is carried out very efficiently by a conventional method such as injection molding, extrusion molding, blow molding, calendering, inflation and the like according to the types of the resin and the desired shapes of the products. When the article is to be shaped with the resin alone with optional additive ingredients in rather small amounts, the resin material in particulate form and the additives may be introduced directly into the molding machine, e.g. extruder machine or injection machine, where the resin is melted by heating and extruded or injected through a die or into a metal mold.

On the other hand, many of the plastic articles are shaped with a resin composite loaded with considerably large amounts of a filler. When a thermoplastic resin and a filler are introduced into a molding machine as a mere blend of both in particulate or powdery forms, there unavoidably takes place segregation of the components leading to an uneven distribution of the components owing to the large difference in the powder characteristics of both components so that no uniformity in the quality of the shaped products can be ensured in such a single-step process. Accordingly, it is a common practice in the production of shaped articles of thermoplastic resins loaded with a filler than the resin and the filler are first blended and kneaded together at a temperature higher than the softening or melting temperature of the resin into a uniform mass by use of a batch-wise mixing machine such as a Banbury mixer or a continuous mixing machine such as a Farrel continuous mixer or double-screw mixer and then shaped into pellets and shaping of articles in molding machines is carried out with such pellets.

The above described conventional process is composed of the pelletizing step and the shaping step and is effective from the standpoint of obtaining uniformity in the quality of shaped articles in relation to the distribution of the filler in the thermoplastic resin. A problem in this two-step process is the increased costs for the fabrication of the shaped articles in comparison with a single-step process as a natural consequence of the lengthy process as well as due to the increased loss of the materials in the process. What is worse, the thermoplastic resin must twice undergo melting once in the pelletizing step and again in the shaping step resulting in greater thermal degradation of the resin polymer than in a single-step production in addition to the excessive consumption of heat energy. This problem of thermal degradation is more severe when the thermoplastic resin is liable to thermal degradation such as ABS resins. Another problem in the filler-loaded resin pellets is that, depending on the nature of the filler, the pellets absorb moisture more or less during storage or transportation after pelletizing when the filler is hygroscopic of affinitive to moisture. Moisture absorption of pellets is of course undesirable due to the possible foaming of the resin composition in the step of shaping in which the resin is heated and melted. In extreme cases, shaping of films by the inflation method or shaping of articles by blow molding is almost impossible because of the rupture of the resin layer with the foams of water vapor. The moisture absorption of the filler-loaded thermoplastic resin pellets is largely responsible to the so-called silver streaking appearing in articles shaped by injection molding. Therefore, filler-loaded resin pellets must be stored under moisture-proof sealing or must be dried by heating directly before introduction into molding machines to avoid problems.

The above disadvantages can be somewhat mitigated by a recently proposed method in which pellets of the resin with filler loading much higher than in the final formulation are prepared in advance and these highly filler-loaded pellets are blended with calculated amounts of the resin per se just before introduction into a molding machine to give a desired final filler content. This method is, however, also a two-step process and hence far from satisfactory.

Several attempts have been made to carry out a single-step production process in which a mere blend of a particulate or powdery thermoplastic resin and a filler is directly introduced into a molding machine without being pelletized. Such an attempt is of course successful when a molding machine of specific design is used such as a double-screw extruder or kneader-extruder in which kneading and extrusion of the blend are performed successively. This principle is, however, not applicable to most of the conventional molding machines for general purpose in which the step of extrusion or injection is not always preceded by the step of thorough kneading of the blend.

For example, an attempt to introduce a blend of a filler and single-component pellets of the resin alone is unsuccessful due to the large segregation of the components as mentioned before while an attempt to introduce a blend of a finely powdered resin and a filler is also impractical, although the distribution of the filler is somewhat improved in comparison with the blend of resin pellets and a filler, problems arise because of the extreme retardation of the feeding rate to the feeder screw of the molding machine resulting in impractically lowered effeciency of production.

Further, there has also been a problem in the process of mixing or kneading of a thermoplastic resin and a filler in a mixing machine such as a Banbury mixer as a preceding step of the production of the resin composition into shaped articles. In carrying out the mixing in such a mixing machine, weighed amounts of the components are introduced into the mixing chamber of the machine and the chamber is closed by lowering a cover called "float" followed by the rotation of the rotor and heating by means of the jacket to effect plasticization or gelation of the resin into which the filler is incorporated by the shearing force given by the rotor. Since fillers are usually in finely divided powdery form, it is unavoidable that a considerable amount of the filler is scattered during descending of the float or during the period before the gelation of the resin through the gaps between the float and the jacket leading to the loss of materials. To avoid this difficulty, it is sometimes practiced to move the float up and down several times before the beginning of gelation so that the filler scattered on the float can be brought back into the chamber. This method is, however, very troublesome for the relatively small effect in addition to the disadvantages of rather accelerated scattering of the filler by the movement of the float and intrusion of foreign matters accompanying the movement of the float.

SUMMARY OF THE INVENTION

Thus a primary object of the present invention is to provide a novel and improved method for producing a filler-loaded thermoplastic resin composite, in which scattering of the filler is reduced to a great extent with consequent acceleration of the mixing.

Another object of the invention is to provide a method for producing a filler-loaded thermoplastic resin composite by mixing a resin in particulate form, i.e. powders, granules, beads or pellets, with a filler in the presence of fibrillatable polytetrafluoroethylene.

Another object of the invention is to provide a method for producing a filler-loaded thermoplastic resin composite by mixing a resin with a filler in the presence of fibrillatable polytetrafluoroethylene, wherein the resin and the filler is mixed under the condition of forming easy-collapsing aggromerates, continuously or separately followed by mixing in the temperature higher than the gelation of the resin.

Another object of the invention is to provide a method for producing shaped articles with a filler-loaded thermoplastic resin composite by mixing a resin with a filler, followed by pelletizing or shaping the resin composite introducing into a pelletizer, a molding machine such as an extrusion molding machine or injection molding, or the other shaping machines.

Another object of the invention is to provide a method for producing the foamed products with a filler-loaded thermoplastic resin composite by mixing a resin and a filler with a foaming agent in the presence of fibrillatable polytetrafluoroethylene, followed by shaping and heating to foam the resin composite.

Further object of the invention will become apparent from the description to follow.

The method for producing a filler-loaded thermoplastic resin composite according to the invention comprises mixing from about 20 to about 80 parts by weight of the thermoplastic resin, preferably in particulate form, with from about 80 to about 20 parts by weight of a filler and optionally small amount of conventional additives in the presence of from 0.01 to 5% by weight of a fibrillated polytetrafloroethylene based on the sum of the resin and the filler under the condition of forming an easy-collapsing agglomerate of the components prior to gelation of the resin, which agglomerate is not fluidized and does not flow spontaneously.

The fibrillatable polytetrafluoroethylene (hereinafter referred to as PTFE) is subjected to shearing force during the mixing operation and fibrillated midway in the mixing, and then the components form the easy-collapsing agglomerate without flowing property captured in the entanglement of the fibrils of the PTFE. Thereafter, a filler-loaded thermoplastic resin composite is optionally mixed in a temperature higher than the gelation of the resin, in which composite a filler is uniformly dispersed. Accordingly, whole mixing time is very shortened in comparison with conventional mixing process and the resin composite is obtained in a well uniformly dispersed state of the filler. Not less than 80% by weight of the temporary loose agglomerate formed midway in the mixing does not pass through a 16 mesh screen by the Tyler standard because of the lack of flowing property.

DETAILED DESCRIPTION OF THE INVENTION

The present invention is very versatile and applicable to almost all combinations of particulate thermoplastic resins and fillers. The thermoplastic resins used by the invention include polyolefin resins such as low-density polyethylenes, high-density polyethylenes, polypropylenes, copolymers of olefins such as ethylene, propylene and other olefins, copolymers of olefin or olefins and other monomers such as vinyl acetate, acrylic acid, acrylic esters, styrene, vinyl chloride and other monomers, polystyrenes, polyvinyl chloride resins, polyvinylidene chloride resins, polymethyl methacrylate resins, ABS resins, synthetic rubbers such as polybutadiene, polyisoprene, chloroprene and neoprene, polyamide resins, polyester resins, polycarbonate resins and the like. These resins are optionally used singly or as a mixture of two kinds or more. The form of these thermoplastic resins is not particularly limitative and can preferably be in the form of particulate such as powders, granules, beads or pellets. In case of producing cellular foamed materials, polyolefin resins are preferable as thermoplastic resins.

The fillers to be mixed with the thermoplastic resins are inert and include both inorganic and organic ones as exemplified by finely divided silica fillers, magnesium carbonate, calcium carbonate, talc, mica powders, kaolin, diatomaceous earth, aluminum hydroxide, calcium sulfate, barium sulfate, calcium sulfite, wood flour, coconut shell flour and the like. They are used either singly or as a combination of two kinds or more according to the object using a filler. The particle size distribution of these fillers are not limitative but they usually have an average particle diameter of from 0.01 to 50 $\mu$m depending on the kind of the fillers.

The ratio of the amounts of the thermoplastic resin and the filler is in the range of 20 to 80 parts by weight of the resin and correspondingly 80 to 20 parts by weight of the filler, preferably 25 to 70 parts by weight of the resin and 75 to 30 parts by weight of the filler. The method of the invention is more effective in the case of using more in an amount of the filler.

In the method of the present invention, a fibril-forming, i.e. fibrillatable PTFE, is mixed with the thermoplastic resin and the filler in the amount of from 0.01 to 5% by weight, based on the sum of the thermoplastic resin and the filler. The fibrillatable PTFE is a well known material in the art and readily available as a commercial product. The commercially available fibrillatable PTFE is in the form of an aqueous dispersion prepared by the emulsion polymerization or in the form of a powder obtained by separation of the resin from the aqueous dispersion followed by drying. The aqueous dispersion of the fibrillatable PTFE contains usually several tens of %, say, up to 60% of the PTFE particles having a diameter of about 0.2 $\mu$m while the powdery products contain agglomerate particles of about 0.5 mm average diameter composed of the primary particles having an average diameter of about 0.2 $\mu$m. The PTFE particles of either form can be readily converted into fibrils when the particles are subjected to mechanical shearing forces.

The amount of the fibrillatable PTFE used in the invention is usually in the range from 0.01 to 5% by weight or, preferably, from 0.1 to 2.0% by weight based on the sum of the resin and the filler, although the exact amount should be determined in consideration of various parameters such as kinds of the thermoplastic resin and the filler, particle size distribution of them, weight ratio of them, formulation of the other additive ingredients such as lubricants and anti-static agents and the like, as well as the types of the mixing machine and mixing conditions and shaping methods of the composite into articles. The amount of the PTFE less than 0.01% by weight cannot give the desired effects while the amount more than 5% by weight does not exhibit any additional advantages but causes to make the resin composite adhesive. Generally, the fibrillatable PTFE should be used in relatively much amount, when the composite contains larger proportion of powdery components, the particle diameter of the particles of the thermoplastic resin and/or the filler is smaller, the bulk density of the filler is smaller, and the shearing energy and the heat supply in the mixing machine are smaller.

Several of the examples of the commercially available fibrillatable PTFE are as follows: Teflon 6J (a product by Mitsui Fluorochemical Co.), Teflon 6JC (a product by the same company), Polyflon F-103 (a product of Daikin Kogyo Co.) and Polyflon F-201 (a product by the same company) as the examples of the powdery products and Teflon 30-J (a product by Mitsui Fluorochemical Co.) and Polyflons D-1 and D-2 (products by Diakin Kogyo Co.) as the examples of the aqueous dispersion products.

Of course, the filler-loaded thermoplastic resin composite according to the invention is further optionally admixed with conventional additive ingredients such as pigments, anti-static agents, lubricants, anti-oxidants, ultraviolet absorbers and coupling agents as well as reinforcing fibrous fillers such as glass fibers, asbestos and the like in so far as their amounts are not excessively much. The foaming agent and the crosslinking agent may also be used in the invention. They are exemplified by azodicarbonamide, p-toluylenesulfonyl semicarbazide and the like as the examples of the former and ditert-butylperoxide, 2,5-dimethyl-2,5-di-tert-butyl-peroxyhexyne-3 and the like as the examples of the latter. Their amounts in the resin composite are also determined according to the desired ratio of expansion and other properties in the finished cellular foamed body.

In the invention, it was found to be quite satisfactory for further processing of forming without segregation of the resin and the filler, when easy-collapsing agglomerates formed in the midst of the mixing operation passing through a 16 mesh screen by the Tyler standard does not exceed 20% of the total amount of the resin and the filler.

The fibrillatable PTFE may be admixed with the thermoplastic resin and the filler followed by mixing under shearing forces to be converted into fibrils. Alternatively, the fibrillatable PTFE is preliminarily premixed with the filler under shearing forces to be converted into fibrils followed by mixing them with the thermoplastic resin. The thermoplastic resin particulate and the filler become captured in the entanglement of the fibrils of the PTFE and agglomerated provisionally and weakly in the first stage of mixing operation. Thereafter the agglomerate forms a uniformly dispersed filler-loaded thermoplastic resin composite during mixing operation.

For the necessity of mixing a resin with the easy-collapsing agglomerated premixture, the method for premixing a filler with a fibrillatable PTFE cannot simplify the steps of mixing a resin and a filler, though it is possible to reduce the total mixing time. Then the preferable method in the invention is to mix a resin with a filler and a fibrillatable PTFE under shearing forces without premixing. In the invention, it is admittable to fibrillate a PTFE in the absence of a thermoplastic resin by the reason that a fibrillatable PTFE is easily fibrillated during little time before a resin is softened by the ascent of a temperature. In this case, it it obtained to curtail the steps of mixing and reduce the mixing time.

The advantages obtained with the invention are that the mixing is very smooth, the scattering of the filler is very little, the mixing time is short, the filler-loaded thermoplastic resin composite is very uniform in the dispersion of the filler and the pressure of the resin composite at flange is very stable. For example, when a mere non-kneaded mixture of 50% by weight of pelletized polypropylene and 50% by weight of talc was supplied to a 90 mm diameter single-screw extruder, the rate of extrusion was only 14 kg/hour because of screw's insufficient catching of the mixture and extrusion molding was practically impossible because of remarkable surging. On the other hand, when the resin composite produced by the invention was supplied to the same machine, the rate of extrusion was as large as 120 kg/hour and there was no surging.

Further advantages in the invention are obtained in the possibility that the steps of the pre-drying or pre-heating of the raw materials can be omitted. In the process of shaping a filler-loaded thermoplastic resin to decrease the moisture content of the materials as far as possible in order to obtain shaped articles of good quality. When the moisture content in the resin mixture is small, the use of a vent-type machine is possible to some extent but a resin blend containing considerable amounts of moisture cannot be shaped with a vent-type molding machine. In particular, pre-drying of the materials is essential in blow molding or inflation method for manufacturing plastic films where non-vent-type single-screw extruder machines are employed. The mixing operation according to the invention bring about rapid temperature elevation during the mixing by the heat of friction evolved with shearing in the resin composite so that the effect of pre-drying or pre-heating of the materials is spontaneously obtained necessitating no separate means for the treatment of pre-drying or pre-heating.

The mixing machine used to the invention is not particularly limitative, provided that sufficient shearing energy can be imparted to the materials to effect fibrillation of the PTFE. Several of the examples are ribbon blender, Henschel mixer, Banbury mixer, intermixers, supermixers, kneaders, screw blenders and the like. These mixing machines are optionally used independently or continuously followed by the forming machine such as pelletizer, extruder, two-roller mill, calendering machine, molding machines of injection molding, extrusion molding, blow molding, press molding and the like. These mixing machines are not necessarily provided with outer heating means since the resin composite is spontaneously heated by the heat evolved in shearing.

The filler-loaded thermoplastic resin composite produced by the present invention is optionally formed into pellets, films, sheets, plates, injection molded articles, extrusion molded articles, blow molded articles and other shaped articles.

Another application of the invention is concerned with producing cellular foamed bodies of a filler-loaded thermoplastic resin composite or, in particular, a polyolefin resin composite of high expansion having a fine and uniform cellular structure and smooth surfaces. Thus, the process for producing cellular foamed bodies is carried out by first mixing the polyolefin resin with the filler, foaming agent and crosslinking agent together with a small amount of a fibrillatable PTFE to form an unexpanded plate by use of a two-roller mill or the like and then subjecting the plate to expansion in a mold by use of a molding press. The foaming agent and the crosslinking agent have usually decomposition temperatures 10° to 20° C. higher than the melting point of the thermoplastic resin.

The step of expansion is carried out in a conventional manner with great advantages not only in the large improvement in the productivity owing to the decreased processing time but also in the superior properties of the finished cellular foamed bodies such as high ratios of expansion and absence of gross porosities and surface roughness owing to the prevention of premature decomposition of the foaming agent and the crosslinking agent without excessive temperature elevation in mixing as a consequence of the shortened mixing time.

Following are the examples to illustrate the present invention in further detail but not to limit the scope of the invention in any way. In the following examples, parts are all given by parts by weight.

EXAMPLE 1

(Experiments No. 1 to No. 7)

For the sake of studying the effect of the mixing under shearing force, non-kneaded resin blends were prepared by blending 35 parts of a pelletized high-density polyethylene of about 3 mm diameter having a melt index of 0.4, density of 0.962 g/cm³ and melting temperature of 134° C., 64 parts of a heavy calcium carbonate having an average particle diameter of about 4 $\mu$m and 1 part of calcium stearate without or with admixture of a fibrillatable PTFE (Teflon 6J, a product by Mitsui Fluorochemical Co.) in an amount indicated in Table 1 below.

Each 85 kg portion of the non-kneaded resin blends was mixed in a Banbury mixer of 70 liter capacity for a time indicated in the table to obtain a melted resin composite. The temperature conditions in the Banbury mixer were: temperature of the casing 150° C.; temperature of the charged material 25° C.; and temperature of the mixed materials as discharged 180° C.

The kneaded resin composites produced by using Banbury mixer were followingly transferred into a 24-inch two-roller mill and mixed for additional 3 minutes. The two-roller mill was operated with the conditions of the temperature of the rollers 150° C.; velocity of the rollers 33 r.p.m. and 38 r.p.m. and the gap of rollers 5 mm.

The resin mixtures were further followingly calendered into a sheet of 0.2 mm thickness by use of a 18-inch calendering machine of reversed-L type operated with the conditions of: the temperature of the first to third rollers 175° C.; temperature of the fourth roller 150° C.; temperature of the take-off roller 105° C.; and the peripheral velocity of the fourth roller 15 m/minute.

The conditions in the above process of working in the Banbury mixer and the calendering roller as well as the quality evaluation of the sheet products are summarized in Table 1. In the table, the revolution of bank means the condition of the pool of the plasticized composite accumulated on the roller gap in the calendering machine and the uniform revolution of the bank is an indication of good workability. The numbers of white spots of the filler and the dark spots by the scorching of the resin are the numbers of the respective spots in a 30 cm $\times$ 30 cm area of the sheet sample. The test of the Elemendorf tear strength was carried out according to JIS P 8116 and the ring-crash test was carried out according to JIS P 8126.

TABLE 1

| Experiment No. | | | 1 | 2 | 3 | 4 | 5 | 6 | 7 |
|---|---|---|---|---|---|---|---|---|---|
| | Fibrillatable PTFE added, parts | | 0 | 0.005 | 0.01 | 0.1 | 1 | 5 | 10 |
| Conditions in working | Mixing time in Banbury mixer, minutes | To incipience of gelation | 11 | 11 | 3 | 3 | 3 | 3 | 3 |
| | | Incipience of gelation to discharge | 5 | 5 | 5 | 5 | 5 | 5 | 5 |
| | | Total | 16 | 16 | 8 | 8 | 8 | 8 | 8 |
| | Scattering of filler on float | | yes | yes | yes | no | no | no | no |
| | Adhering of material to rollers | | good | good | good | good | good | good | poor |
| | Revolution of bank | | uniform | uniform | uniform | uniform | uniform | uniform | no revolution |
| Product evaluation | White spots of filler, pieces | | 20 | 24 | 3 | 2 | 3 | 4 | 3 |
| | Dark spots by scorching, pieces | | 8 | 10 | 0 | 1 | 0 | 0 | 0 |
| | Elemendorf tear strength, g | MD | 630 | 650 | 620 | 620 | 640 | 570 | 280 |
| | | TD | 210 | 220 | 220 | 210 | 200 | 190 | 160 |
| | Ring-crash test, kg | MD | 72 | 70 | 72 | 74 | 70 | 68 | 54 |
| | | TD | 74 | 72 | 70 | 74 | 72 | 66 | 52 |

EXAMPLE 2

(Experiments No. 8 to No. 23)

Kneaded resin composites were prepared by mixing in an intermixer of 3 liter capacity with a pelletized isotactic polypropylene having a melt index of 0.6, density of 0.90 g/cm³ and softening point of 145° C. and talc having an average particle diameter of about 8 $\mu$m in a varied proportion as indicated in Table 2 below together with or without 0.5 part of a fibrillatable PTFE (Polyflon F-103, a product by Daikin Kogyo Co.) per 100 parts of the sum of the resin and talc.

The amounts of the materials put into an intermixer were determined by calculation such that the kneaded resin composite would occupy a volume of 3 liters. The intermixer was operated with a velocity of the rotor of 50 r.p.m. and the temperature of the casing of 120° C. The temperature of the materials put into the intermixer was 25° C. while the temperature of the discharged resin composite was 200° C. The conditions of working in this mixing are summarized in Table 2. In experiments No. 20, No. 22 and No. 23, mixing effect was hardly obtained.

The thus obtained resin composite was shaped into a film of 0.1 mm thickness by compression molding in a press at 200° C. and the dispersion of the filler was visually examined to give the results as shown in Table 2.

amount of the filler in small pieces of the sample sheets and the maximum and minimum contents were recorded. The melt index of the extruded material in g/10 minutes and tensile strength in kg/cm², ultimate elongation in % and tear strength in g of the sheet samples were determined in accordance with the methods specified in JIS K 6758, JIS K 6734 and JIS P 8216, respectively.

No sheet samples were obtained from the resin com-

TABLE 2

| Experiment No. | | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|
| Formu- | Polypropylene | 100 | | 90 | | 80 | | 60 | | 40 | | 30 | | 20 | | 15 | |
| lation, | Talc | 0 | | 10 | | 20 | | 40 | | 60 | | 70 | | 80 | | 85 | |
| parts | PTFE | 0 | 0.5 | 0 | 0.5 | 0 | 0.5 | 0 | 0.5 | 0 | 0.5 | 0 | 0.5 | 0 | 0.5 | 0 | 0.5 |
| Time to incipience of gelation, minutes | | 3 | 3 | 3.5 | 3 | 4 | 3 | 4.5 | 3 | 6 | 3.5 | 18 | 4 | — | 4.5 | — | — |
| Torque at rotor shaft after 3 minutes of mixing, kg · m | | 85 | 85 | 70 | 85 | 50 | 80 | 40 | 80 | 20 | 80 | 10 | 70 | 5 | 60 | 5 | 40 |
| Scattering of filler on float | | — | — | no | no | a little | no | yes | no | yes | no | yes | no | yes | no | yes | no |
| Incipience of gelation to discharge, minutes | | 4 | 4 | 4 | 4 | 4 | 4 | 4.5 | 4.5 | 4.5 | 4.5 | 5 | 5 | *— | 5 | *— | *— |
| Filler dispersion in press-molded film | | — | — | good | good | good | good | good | good | poor | good | poor | good | — | good | — | — |

*It was impossible to mix (i.e. kneaded).

EXAMPLE 3

(Experiments No. 24 to No. 27)

Two kinds of non-kneaded resin blends were prepared with 50 parts of a pelletized polypropylene having a melt index of 1.0 and density of 0.90 g/cm³, 50 parts of talc having an average particle diameter of about 5 μm and 0.05 part of an anti-oxidant (Irganox 1010, a product by Ciba Geigy Co.) together with or without 0.2 part of a fibrillatable PTFE (Teflon 6J). The resin blends had a moisture content of 0.2% by weight and a bulk density of about 0.50 kg/liter.

A 5 kg portion of each of the above prepared resin blends was put into a supermixer of 20 liter capacity and mixed for 5 minutes with the temperature of the jacket at 150° C. and the velocity of the blades of 400 r.p.m.

The resin composite with PTFE was heated spontaneously up to 140° C. for the sake of shearing force by mixing, well mixed in the state of easy collapsing agglomerates captured by the fibrillated PTFE, decreased to the moisture content of 0.01% by weight after mixing and had a bulk density of 0.70 kg/liter. On the other hand, the resin composite without PTFE was remained in the unchanged temperature of 50° C. and moisture of 0.2% by weight, had a considerable amount of the filler segregated from the polypropylene resin because of having been in the state of being not imposed on shearing force, had a bulk density of 0.45 kg/liter and passed a 16 mesh screen in the proportion of more than 20% by weight.

In the next, each of the parts of thus obtained resin composites was respectively conditioned at a temperature of 140° C. or 50° C. by heating or cooling and the temperature-conditioned resin composites were subjected to extrusion molding into a sheet of 0.5 mm thickness by use of a vent-type single-screw extruder machine of 90 mm diameter equipped with a Dalmage-type screw of L/D=28, compression ratio of the screw of 3.5 and rotating at a velocity of 80 r.p.m. These extruding conditions are given in Table 3 together with the physical properties of the sheet products.

In Table 3, the segregation of the resin and the filler was evaluated by the analytical determination of the posite without the PTFE by reason of the very remarkable surging in extrusion.

TABLE 3

| Experiment No. | | | 24 | 25 | 26 | 27 |
|---|---|---|---|---|---|---|
| Fibrillatable PTFE | | | yes | yes | no | no |
| Temperature of resin composite feed, °C. | | | 140 | 50 | 140 | 50 |
| Average rate of extrusion, kg/hour | | | 122 | 120 | 13 | 14 |
| Range of resin pressure fluctuation at flange, kg/cm² | maximum | | 150 | 150 | 140 | 140 |
| | minimum | | 145 | 145 | 60 | 60 |
| Segregation of filler, % by weight of filler in the sheet | maximum | | 50 | 50 | 58 | 57 |
| | minimum | | 49 | 49 | 40 | 42 |
| Filler dispersion, visual | | | good | good | white spots | white spots |
| Melt index of extruded material, g/10 minutes | | | 1.0 | 0.94 | 1.5 | 1.7 |
| Mechanical properties of sheet | tensile strength, kg/cm² | MD | 300 | 300 | — | — |
| | | TD | 280 | 290 | — | — |
| | ultimate elongation, % | MD | 20 | 20 | — | — |
| | | TD | 15 | 12 | — | — |
| | tear strength, g | MD | 360 | 350 | — | — |
| | | TD | 300 | 300 | — | — |

EXAMPLE 4

(Experiments No. 28 to No. 31)

Two kinds of non-kneaded resin blends were prepared with 35 parts of a powdered high-density polyethylene having a melt index of 0.9, density of 0.952 g/cm³ and average particle diameter of about 5 μm, 65 parts of a heavy calcium carbonate and 0.5 parts of calcium stearate together with (Experiment No. 28) or without (Experiment No. 29) addition of 0.2 part of a fibrillatable PTFE (Teflon 6J).

Each 150 kg portion of the above resin blends was put into a Henschel mixer of 500 liter capacity and mixed for 10 minutes with the temperature of the jacket at 120°

C. and the velocity of the blades of 350 r.p.m. In case added, fibrillation of the PTFE was effected. The resin composite with the PTFE was well mixed in the state of easy collapsing agglomerates captured by the fibrillated PTFE, but the resin composite was incompletely mixed and a considerable amount of the filler had been segregated from the resin.

The resin composites produced in this example as well as the resin composites produced in Example 3 (Experiments Nos. 30 and 31) were formed into a sheet of 0.5 mm thickness by use of a kneader-extruder (Model TS(80/90), manufactured by Nippon Steel Co.). The extruding conditions and the mechanical properties of the sheet samples are summarized in Table 4.

TABLE 4

| Experiment No. | | | 28 | 29 | 30 | 31 |
|---|---|---|---|---|---|---|
| Fibrillatable PTFE | | | yes | no | yes | no |
| Dispersing state of the filler in the resin composite | | | good | bad | good | bad |
| Average rate of extrusion, kg/hour | | | 260 | 120 | 350 | 200 |
| Range of resin pressure fluctuation at flange, kg/cm² | maximum | | 80 | 65 | 90 | 68 |
| | minimum | | 78 | 48 | 86 | 45 |
| Segregation of filler, % by weight of filler in the sheet | maximum | | 65 | 67 | 50 | 52 |
| | minimum | | 63 | 60 | 49 | 47 |
| Filler dispersion, visual | | | good | good | good | good |
| Melt index of extruded material, g/10 minutes | | | 0.2 | 0.4 | 0.9 | 1.2 |
| Mechanical properties of sheet | tensile strength, kg/cm² | MD | 150 | 140 | 300 | 300 |
| | | TD | 140 | 120 | 300 | 290 |
| | ultimate elongation, % | MD | 100 | 120 | 25 | 20 |
| | | TD | 40 | 20 | 20 | 18 |
| | tear strength, g | MD | 2000 | 1900 | 320 | 340 |
| | | TD | 2100 | 2100 | 300 | 280 |

EXAMPLE 5

(Experiments No. 32 to No. 41)

Non-kneaded resin blends were prepared with a powdered polypropylene (FL-600, a product by Sumitomo Kagaku Co.) having a melt index of 8, density of 0.90 g/cm³ and average particle diameter of about 300 μm and talc in varied proportions with or without a fibrillatable PTFE (Teflon 6J) in parts as indicated in Table 5.

Each 5 kg portion of the resin blends was put into a Henschel mixer of 20-liter capacity and mixed for 7 minutes with the temperature of the jacket at 150° C. and the velocity of the blades of 750 r.p.m. The resin composites with the PTFE in an amount of at least 0.05 part were well mixed in the state of easy-collapsing agglomerates captured by the fibrillated PTFE (Experiments Nos. 32, 33, 34 and 35), but the resin composites without the PTFE were incompletely mixed and a considerable amount of the filler had been segregated from the resin (Experiments Nos. 39, 39, 40 and 41). Experiments Nos. 36 and 37 indicated that the mixing was not affected by the addition of a fibrillatable PTFE, when the amount of the filler was smaller than 20 parts based on 100 parts of the sum of the resin and the filler.

Each of the above resin composites was supplied to an injection molding machine (Model TS-150, 5 oz. in capacity, ordinary type, manufactured by Nissei Jushi Kogyo Co.) and shaped into a plate of 76 mm square and 1.6 mm thick. In this molding test, the intrusion or charge time for one shot was recorded as shown in Table 5. When the charge time was very long such as in Experiments Nos. 39 and 40, it was almost impossible to inject the resin composite continuously. The dispersion of the filler in the thus prepared plate samples was good in all of the experiments as far as the visual examination was concerned. However, the filler segregation test undertaken with pieces of the plate samples indicated the effectiveness of the addition of the PTFE as shown by the difference between the maximum and minimum contents of the filler given in Table 5. Table 5 also gives the results of the measurements of the tensile strength and the elastic modulus undertaken in accordance with JIS K 7113 by use of the No. 1 dumbell-shaped test specimens.

TABLE 5

| Experiment No. | | 32 | 33 | 34 | 35 | 36 | 37 | 38 | 39 | 40 | 41 |
|---|---|---|---|---|---|---|---|---|---|---|---|
| Formulation of resin composite, parts | Polyproplyene | 80 | 60 | 40 | 30 | 90 | 90 | 80 | 60 | 40 | 30 |
| | Talc | 20 | 40 | 60 | 70 | 10 | 10 | 20 | 40 | 60 | 70 |
| | PTFE | 0.05 | 0.1 | 0.15 | 0.2 | 0 | 0.03 | 0 | 0 | 0 | 0 |
| Charge time, seconds | | 12 | 15 | 8 | 24 | 11 | 11 | 15 | 100 | 360 | 420 |
| Segregation of filler, % by weight of the filler in the plate | maximum | 21 | 41 | 62 | 72 | 11 | 11 | 22 | 43 | 66 | 77 |
| | minimum | 19 | 38 | 58 | 67 | 9 | 9 | 18 | 37 | 54 | 62 |
| | difference | 2 | 3 | 4 | 5 | 2 | 2 | 4 | 6 | 12 | 15 |
| Mechanical properties of plate | tensile strength, kg/cm² | 300 | 330 | 320 | 300 | 240 | 250 | 300 | 330 | 330 | 300 |
| | tensile elastic modulus, kg/cm² | 30000 | 37000 | 54000 | 60000 | 21000 | 21000 | 28000 | 38000 | 55000 | 60000 |

EXAMPLE 6

(Experiments No. 42 to No. 48)

Non-kneaded seven resin blends were prepared each with 40 parts of a powdered high-density polyethylene having a melt index of 0.9, density of 0.954 g/cm³ and melting point of 124° C., 55 parts of a heavy calcium carbonate having an average particle diameter of about 4 μm, 3.8 parts of azodicarbonamide, 1.0 part of di-tert-butylperoxide and 0.2 part of magnesium stearate with or without a fibrillatable PTFE (Teflon 6J) as indicated in Table 6.

Each 80 kg portion of the resin blends was put into a Banbury mixer of 70 liter capacity with the casing heated at 100° C. and mixed for about 8–25 minutes. By this mixing operation, the temperature of the resin composite was elevated from 30° C. to 140°–150° C.

When contained 0.01 or more part by weight of the PTFE, the PTFE was fibrillated in the beginning of the mixing operation and captured the resin, the filler and other components in its entanglement, and then the resin composite was continuously mixed to form a resin mass uniformly dispersed the filler.

The resin composite was shaped into a plate of 15 mm thickness by use of a 28-inch two-roller mill with the velocity of the rollers of 33 r.p.m. and 38 r.p.m. at 130° C. and the plate was then subjected to in-mold expansion by foaming with the temperature of the press at 180° C. and heating time of 15 minutes into a cellular foamed body of 40 mm thickness.

The mixing time in the Banbury mixer and the temperature of the discharged resin composite as well as the properties of the foamed products are summarized in Table 6.

TABLE 6

| Experiment No. | | 42 | 43 | 44 | 45 | 46 | 47 | 48 |
|---|---|---|---|---|---|---|---|---|
| Amount of PTFE added, parts | | 0 | 0.005 | 0.01 | 0.1 | 1.0 | 10 | 15 |
| Mixing time in Banbury mixer, minutes | to incipience of gelation | 20 | 20 | 3 | 3 | 2.8 | 2.8 | 2.7 |
| | incipience of gelation to discharge | 5 | 5 | 5 | 5 | 5 | 5 | 5 |
| | Total | 25 | 25 | 8 | 8 | 7.8 | 7.8 | 7.7 |
| Temperature of discharged composite, °C. | | 145 | 145 | 146 | 145 | 145 | 143 | 144 |
| Properites of cellular foamed product | ratio of expansion | 7.8 | 7.6 | 10.6 | 10.5 | 10.4 | 10.4 | 7.2 |
| | gross porosity | no | no | no | no | no | no | no |
| | condition of cell structure | not uniform | not uniform | uniform and fine | uniform and fine | uniform and fine | uniform and fine | not uniform |

What is claimed is:

1. A method for producing a filler-loaded thermoplastic resin composite with very uniformly dispersed filler, which comprises as components (a) from about 20 to 80 parts by weights of a thermoplastic resin, (b) from about 80 to 20 parts by weight of a filler and (c) a fibrillatable polytetrafluoroethylene in an amount of from 0.01 to 5% by weight based on the total of the resin and the filler, comprising the steps of
    fibrillating the polytetrafluoroethylene by sufficiently mixing the components in particulate form under shearing forces,
    to form a substantially dehydrated easy-collapsing agglomerate of the components captured in the entanglement of the fibrils of the polytetrafluoroethylene, and
    then continuing mixing at a temperature higher than the gelation temperature of the resin.

2. A method for producing a shaped article of filler-loaded thermoplastic resin composite which comprises (a) from about 20 to 80 parts by weight of a thermoplastic resin, (b) from about 80 to 20 parts by weight of filler and (c) a fibrillatable polytetrafluoroethylene in an amount of from 0.01 to 5% by weight based on the total of the resin and the filler, comprising the steps of
    fibrillating the polytetrafluoroethylene by sufficiently mixing the components in particulate form under shearing forces
    to form a substantially dehydrated easy-collapsing agglomerate of the components captured in the entanglement of the fibrils of the polytetrafluoroethylene,
    then continuing mixing the agglomerate at a temperature higher than the gelation temperature of the resin to form a uniform mixture of melted filler-loaded resin and
    shaping the melted filler-loaded thermoplastic resin composite.

3. The method of claim 1 or 2, wherein the thermoplastic resin is selected from the group consisting of polyolefin resins, polystyrenes, polyvinyl chloride resins, polyvinylidene chloride resins, polymethyl methacrylate resins, ABS resins, synthetic rubbers, polyamide resins, polyester resins, polycarbonate resins and the like.

4. The method of claim 1 or 2, wherein the filler is selected from the group consisting of silica fillers, magnesium carbonate, calcium carbonate, talc, mica powders, kaolin, diatomaceous earth, aluminum hydroxide, calcium sulfate, barium sulfate, calcium sulfite, wood flour, coconut shell flour and the like.

5. The method of claim 2, wherein the shaping comprises pelletizing.

6. The method of claim 2, wherein the shaping comprises extrusion molding.

7. The method of claim 2, wherein the shaping comprises calendering.

8. The method of claim 2, wherein the shaping comprises injection molding.

9. The method of claim 2, wherein the shaping comprises blow molding.

10. The method of claim 2, wherein the shaping comprises press molding.

11. The method of claim 2, wherein the filler-loaded thermoplastic resin composite contains an effective amount of a foaming agent and optionally a crosslinking agent.

12. The method of claim 11, wherein the resin composite is shaped to form a plate or sheet and subjected to expansion with heating to form a cellular foamed body.

13. The method of claim 11 wherein the filler-loaded thermoplastic resin composite contains an effective amount of a crosslinking agent.

14. The method of claim 1 or claim 2, wherein the fibrillatable polytetrafluoroethylene is used in an amount of from 0.1 to 2% by weight based on the total amount of the resin and the filler.

* * * * *